(12) United States Patent
Luo et al.

(10) Patent No.: US 9,817,744 B2
(45) Date of Patent: Nov. 14, 2017

(54) METHOD AND APPARATUS FOR TRACING MEMORY ACCESSES

(75) Inventors: Zhi Da Luo, Beijing (CN); Wei Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 13/433,125

(22) Filed: Mar. 28, 2012

(65) Prior Publication Data

US 2012/0254838 A1    Oct. 4, 2012

(30) Foreign Application Priority Data

Mar. 29, 2011  (CN) .......................... 2011 1 0077585

(51) Int. Cl.
- *G06F 9/44* (2006.01)
- *G06F 11/34* (2006.01)
- *G06F 11/36* (2006.01)

(52) U.S. Cl.
CPC ...... *G06F 11/3476* (2013.01); *G06F 11/3636* (2013.01); *G06F 11/3644* (2013.01); *G06F 2201/865* (2013.01)

(58) Field of Classification Search
USPC .......................................................... 717/128
See application file for complete search history.

(56) References Cited

U.S. PATENT DOCUMENTS

| | | | |
|---|---|---|---|
| 6,668,211 B1 * | 12/2003 | Fujita et al. .................. | 700/245 |
| 6,738,965 B1 * | 5/2004 | Webster ........................ | 717/128 |
| 7,325,106 B1 | 1/2008 | Dmitriev et al. | |
| 7,716,450 B2 | 5/2010 | Garst et al. | |
| 8,347,273 B2 * | 1/2013 | Nageshappa et al. ........ | 717/133 |
| 2006/0059156 A1 * | 3/2006 | Janes et al. ...................... | 707/9 |
| 2007/0150509 A1 * | 6/2007 | Lev et al. ................. | 707/103 R |
| 2008/0010327 A1 * | 1/2008 | Steensgaard et al. ........ | 707/206 |
| 2009/0328007 A1 * | 12/2009 | Chen et al. .................... | 717/128 |
| 2010/0030968 A1 * | 2/2010 | Pasch et al. .................. | 711/125 |
| 2010/0077388 A1 | 3/2010 | Kimura | |
| 2010/0114999 A1 * | 5/2010 | Qi ................................. | 707/816 |
| 2011/0078684 A1 * | 3/2011 | Luo et al. ..................... | 718/100 |
| 2012/0254838 A1 * | 10/2012 | Luo et al. ..................... | 717/128 |

FOREIGN PATENT DOCUMENTS

CN    101515245    8/2009

* cited by examiner

*Primary Examiner* — Lewis A Bullock, Jr.
*Assistant Examiner* — Theodore Hebert
(74) *Attorney, Agent, or Firm* — Steven M. Greenberg, Esq.; CRGO Law

(57) ABSTRACT

Apparatus, computer-readable storage medium and a method executed by a computer for tracing the memory accesses of an object-oriented program comprises assigning a unique identification to each class object created from at least one class in the object-oriented program by modifying a class definition of the at least one class. In response to an unloading of one of the class objects, obtaining class unloading related information from a runtime environment of the object-oriented program and obtaining the unique identification of the unloaded class object according to the returned information. Then releasing memory space assigned to the unloaded class object for storing the memory access information of the unloaded class object.

15 Claims, 3 Drawing Sheets

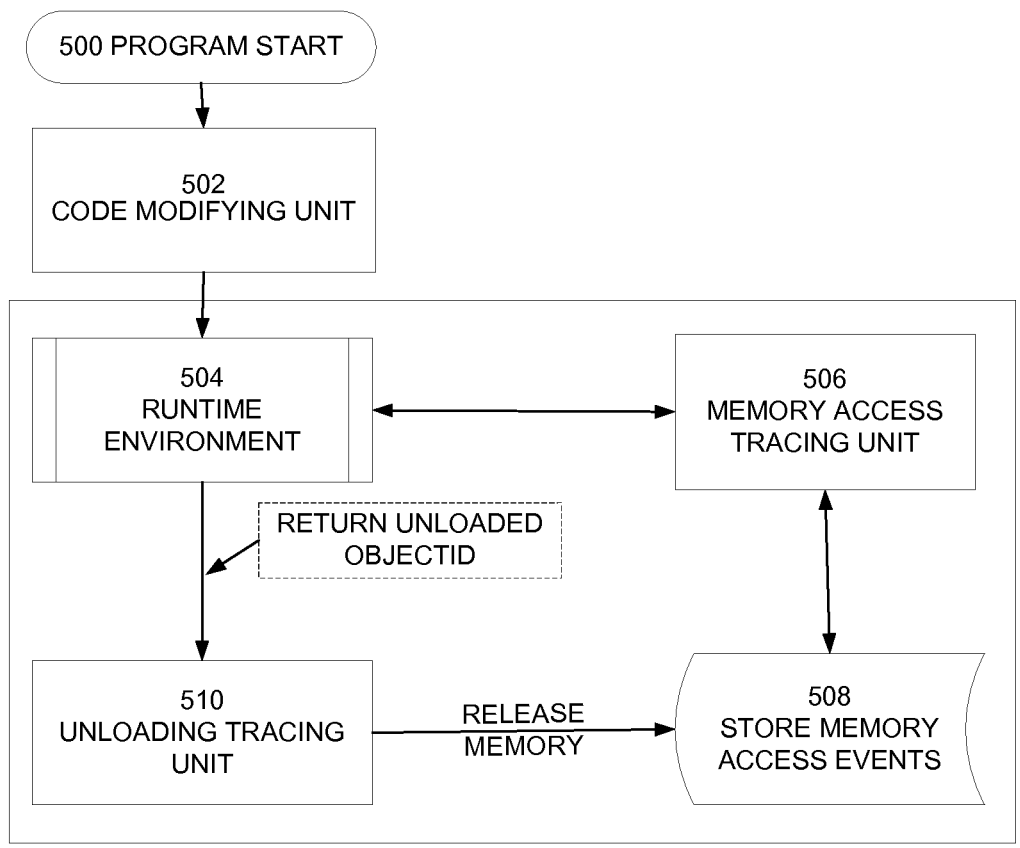

METHOD AND APPARATUS FOR TRACING MEMORY ACCESSES

TECHNICAL FIELD

This invention relates to memory management, and more particularly relates to a method and an apparatus for tracing memory accesses.

DESCRIPTION OF THE RELATED ART

In order to analyze and manage computer memory, a Java Virtual Machine (JVM) and similar class directed systems usually need to trace the memory access history while a program is running. The memory access history can be used to perform several kinds of memory analysis such as memory leak detection, data race detection, and so on. To trace the memory access, it is necessary to perform preliminary processing on the program such that it can record the related memory access events during the program running.

FIG. 1 illustrates one solution for tracing the memory access in one existing technique. As shown in the figure, to trace the memory access status of a program while it is running, the program to be executed is firstly instrumented to have assistant codes inserted. The inserted assistant codes contain some instructions for recording the reading, writing and other operations on the memory during the program running. Then, in the runtime environment, not only the original program, but also the inserted codes are executed together. When executed, the inserted assistant codes will call routines in the memory access tracing module to monitor and record each memory access event, and store the recorded memory access events in a storage device, such as memory, database, and so on.

It can be seen that in the above solution, in order to realize memory access tracing, it needs to execute the assistant codes and store various memory access events temporarily in the memory. Because the amount of memory access events is usually very large, recording such memory access events additionally costs a lot of memory, which causes huge memory overhead. For example, according to the above solution, the memory consumption for dynamic memory analysis of International Business Machines Corp. WAS (Websphere Application Server) application is 3.3 times more than that when running the original application; the memory consumption for tracing the memory access status of the Apache Tomcat application is 3 to 5 times more than that of the original application.

In order to address the huge memory overhead problem caused by memory analysis itself, some methods of the existing techniques are proposed to improve the above solution. In one method, large enough memory space is provided for running and analyzing the program. However, this method is popular only in academic research fields, but not feasible in real applications. In another method, a filtering tool is designed, which reduces the memory usage of memory access events by filtering and removing some unimportant memory access events according to certain algorithms and strategies. However, the proposed filtering algorithms and strategies are often too complex to be widely implemented. In one common memory tracing method, memory access events are directly written into a file for post analysis. Although this method can reduce the memory usage, it loses the advantage and benefit of on-the-fly or real-time memory analysis. Especially for some long-time running applications, such as Tomcat and WAS, post analysis is not suitable.

On the other hand, currently many applications, for example the above-mentioned Tomcat and WAS, are programmed using Object-Oriented languages. Different from the traditional Procedure-Oriented programs that are composed of a series of instructions, Object-Oriented programs are a set of objects cooperating with one another, each of which can receive messages, process data and send messages to other objects. According to the features of Object-Oriented languages, the memory access of Object-Oriented applications can be seen as the memory operation of some object members in the programs. Moreover, many Object-Oriented languages have been designed to have garbage collection functions. A garbage collection function is an automatic memory management solution, which is used to clean up the memory occupied by the objects that are no longer accessed or used by the applications. In this case, if an object is not referenced by any other objects or can't be reached from the root object, then the object and its occupied memory will be collected, moved and rearranged as garbage. Although a garbage collection solution frees programmers of manually dealing with memory allocation and management, it makes it more difficult to trace memory at the same time.

Based on the features of Object-Oriented languages, a special memory tracing solution is expected to reduce the storage overhead of memory tracing and at the same time be simple and easy to implement.

SUMMARY OF THE INVENTION

In view of the above problems, this invention is proposed to provide a memory tracing solution for Object-Oriented languages, in order to solve at least one problem of the existing techniques.

According to one embodiment of the invention, a method executed by a computer for tracing the memory accesses of an object-oriented program comprises assigning a unique identification to each class object created from at least one class in the object-oriented program by modifying a class definition of the at least one class. In response to an unloading of one of the class objects, obtaining class unloading related information from a runtime environment of the object-oriented program and obtaining the unique identification of the unloaded class object according to the returned information. Then releasing memory space assigned to the unloaded class object for storing the memory access information of the unloaded class object.

According to another aspect of the invention, an apparatus is provided for tracing memory accesses of an object-oriented program. The apparatus comprises a code modifying unit, configured to assign a unique identification to each class object created from at least one class in the object-oriented program by modifying a class definition of the at least one class; and a class unloading tracing unit, configured to request class object unloading related information from the runtime environment when one of the class objects is unloaded, obtain the unique identification of the unloaded class object according to the returned information, and release memory space assigned for storing memory access information of the unloaded class object.

According to another embodiment a computer-readable storage medium is provided having nontransitory program code executed by a computer for tracing the memory accesses of an object-oriented program. The computer-readable storage medium comprises program code for assigning a unique identification to each class object created from at least one class in the object-oriented program by modifying a class definition of the at least one class; program code responsive to an unloading of one of the class objects, for obtaining class unloading related information from a runtime environment of the object-oriented program and obtaining the unique identification of the unloaded class object according to the returned information; and program code for releasing memory space assigned to the unloaded class object for storing the memory access information of the unloaded class object.

With the method and apparatus of this invention, each class of the Object-Oriented programs can be labeled and the information of the unloaded classes can be obtained, then the memory space related to the memory access of these unloaded classes can be released, and therefore the storage overhead for tracing the memory access can be greatly reduced.

BRIEF DESCRIPTION OF THE DRAWINGS

FIG. 5 is a block diagram of the apparatus according to one embodiment of the invention.

DETAILED DESCRIPTION OF THE PREFERRED EMBODIMENT

Figure 1:
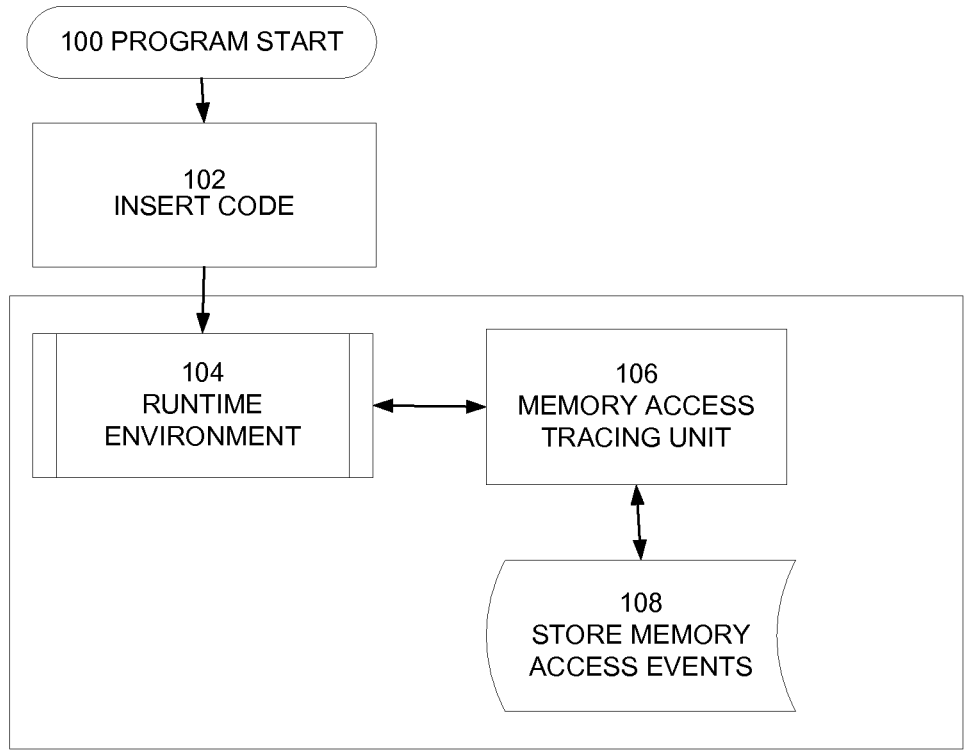
FIG. 1 illustrates one solution for tracing the memory access in the existing technique.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the designer's computer, partly on the designer's computer, as a stand-alone software package, partly on the designer's computer and partly on a remote computer or entirely on the remote computer or server. In the latter scenario, the remote computer may be connected to the designer's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The following is the description of the embodiments in connection with the drawings. It is understood that the following described exemplary embodiments are intended to be illustrative, rather than restrictive, of the present invention.

According to the embodiments of this invention, a method is provided for tracing the memory access of the applications programmed using Object-Oriented languages. As those skilled in the art know, Object-Oriented languages, such as Java, C# and so on, define various classes to which each object belongs in the program. Accordingly, there is a class loader in the runtime environment to dynamically load the needed classes. When the runtime environment judges that a loaded class is no longer needed, it will unload the class. In this case, if the unloaded classes can be labeled and identified, and the corresponding memory space occupied by the memory access events of these classes can be released, then it is possible to reduce the memory overhead while tracing the memory access, and therefore the tracing efficiency can be improved.

Figure 2:
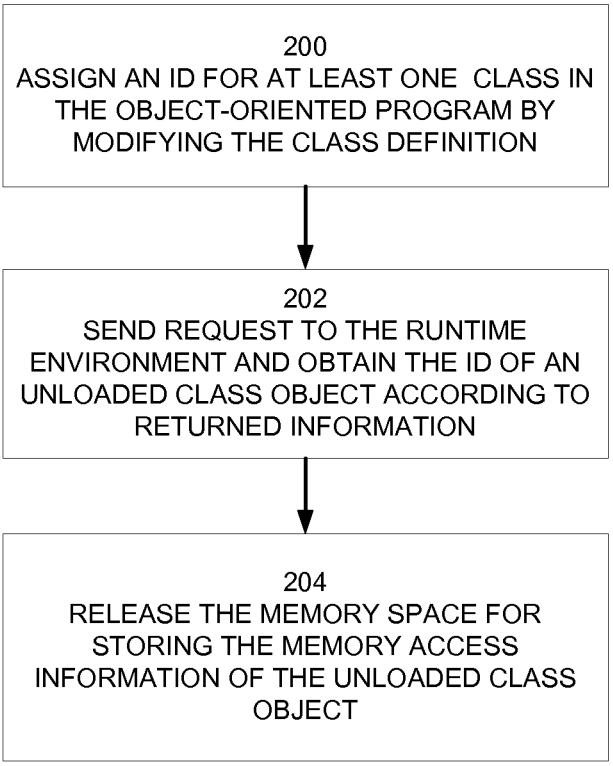
FIG. 2 is a flowchart of the method according to one embodiment of the invention.

Based on the above conception, there is provided in the embodiments of this invention a memory tracing method for Object-Oriented languages, which can improve the space efficiency of memory tracing by releasing the corresponding memory of unloaded class objects. FIG. 2 is a flowchart of the method according to one embodiment of the invention. As shown in the figure, in one embodiment, the method for tracing memory access comprises the following steps: step 20, assigning an ID for at least one class in the Object-Oriented program by modifying the class definition of the program; step 22, requesting class object unloading related information from the runtime environment and obtaining the ID of the unloaded class object according to the returned information; and step 24, releasing the memory space which stores the memory access information of the unloaded class object.

At step 20, for Object-Oriented programs, assigning an ID for a class object can be realized by adding a member in the class definition that describes the common classes, wherein the value of said member in an object denotes the ID of said class object. Such ID assigning process depends on the feature of Object-Oriented programs.

As those skilled in the art know, in Object-Oriented programs, an object is the abstract of real world things, and it is the basic unit of a program. Generally, an object is described using an object name, properties and methods. Object properties, also called data members in Java programs, are a set of data for describing the static features of the object. Object methods, also called services or operations, are the description of the dynamic features (behaviors) of the object. Each method, also called member method, defines a behavior or function of the object. If a set of objects have the same properties and methods, then they make a class. Thus, a class is the abstract and summary of a set of objects, and an object is an instance of a class.

The concept of class enables programmers to uniformly describe all objects that belong to one class. Therefore, in Object-Oriented programs, a class is defined generally before an object, and an object is created based on the defined class. Corresponding to the object features, when describing a class, it is necessary to declare the following three items: the class name, the property description and the method description. In the typical Object-Oriented language Java programs, a class is usually defined in the following format:

```
class name
{
data members
member methods
}
``` wherein the contents between the braces are named the class body, which comprises data members (properties) and member methods (methods). Corresponding to an object, the data members of the class body describe the object properties, while the member methods describe the object behaviors or actions and each member method defines one function or operation. An Object-Oriented program generally contains a plurality of classes, including system-defined classes and user-defined classes, wherein said system-defined classes or class library are a set of standard implemented classes provided by the system, and the class library provides the interfaces between the program and its runtime environment.

Based on the above structure and features of a class in Object-Oriented programs, a new data member can be added in the class definition that describes various ordinary classes, and a corresponding member method can be defined to make said data member specific for each class. Because the data member thus defined has a particular relationship with the corresponding class, such data member can function as an ID for identifying the class object. Thereby, a unique ID is assigned for each class object in the program. In the following, step 20 will be described in detail in connection with the typical Object-Oriented language Java.

In a Java program, there is a plurality of system-defined classes, wherein Java.lang.Class is a special class used to describe the class operation information, and it is a class definition of Java. Accordingly, each user-defined class in the program corresponds to one member of the class Class (short for Java.lang.Class), and one member of the Class is used to describe one user-defined class, such as the class name, the class loader name, etc. of said user-defined class.

Figure 3A:
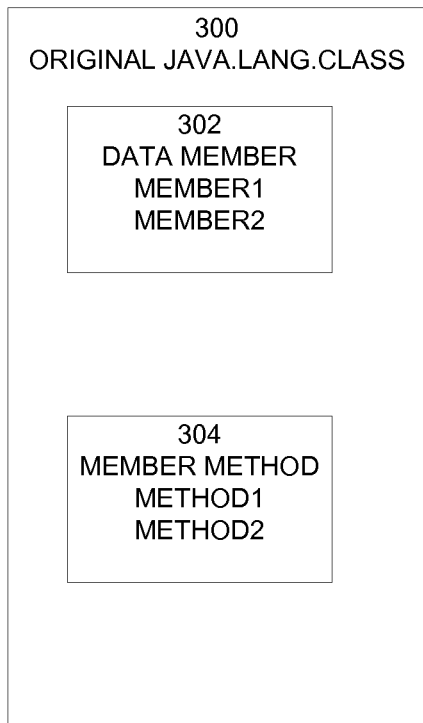
FIG. 3 illustrates the modification of the class definition according to one embodiment of the invention.
Figure 3B:
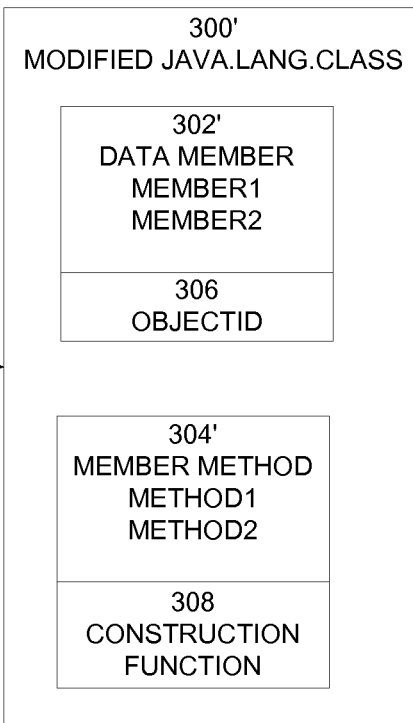

FIG. 3 illustrates the modification of the class definition according to one embodiment of the invention. Specifically, FIG. 3A illustrates the original structure of the class definition Java.lang.Class and FIG. 3B illustrates the modified structure of this class definition. As shown in FIG. 3A, similar to the common class definition, Java.lang.Class also comprises data members 302 and member methods 304. In order to assign a unique ID for each class object, in one embodiment as show in FIG. 3B, a new data member objected 306 is added in Java.lang.Class and the value of objectID is set in the member method 304' through the construction function 308 such that each object of class Class has a different value of objectID.

In one example, a counter is also added in the program, whose value increases by 1 once a class object is loaded. Furthermore, in the above member method, the value of objectID is set as equal to the value of said counter. Therefore, each time a common class is loaded, as one object of the above Class, this common class object will have the above-defined objectID. Moreover, because the counter value is different for each time of loading, each class object obtains its unique objectID.

According to another example, in the above member method, the value of objectID is set as equal to the class loading time. Thus, when loading the classes in turn, the loading time of each class is certainly different from the others, then the obtained objectID is different from one another, and thereby each class object has its unique ID.

In another example, the value of objectID is set as equal to the system-generated UUID through the above member method. UUID is a number generated on a machine, which is guaranteed to be unique among all worldwide machines. Generally, UUID contains at least the combination of the following parts: the current date and time, clock sequence, a unique IEEE machine identifier (e.g. MAC address). Because of the uniqueness of UUID, each class object will get a unique objectID.

Although several embodiments are described in detail, the construction function for setting the value of objectID is not limited to the above. It is understood that as long as a construction function can make the obtained objectID of each class different from others, it can be used to set the value for objectID.

Moreover, although the above embodiments are described in connection with Java language, other Object-Oriented languages, such as C#, Smalltalk, Scala, and so on, all have the similar conception and definition of class and the special class definitiones for describing the common classes. By modifying the class definition similarly to the above embodiments, it can assign a unique ID for each common class object.

On the basis that each loaded class object has its unique ID, at step 22, the ID of the unloaded classe objects can be obtained using the class unloading information returned from the runtime environment, which will be described in detail in the following also in connection with Java language.

As above-mentioned, Java has an automatic garbage collection function. With such function, if an object is no longer referenced by any other objects, the garbage collector will clear this object and release its occupied memory. To control the lifecycle of an object more flexibly, Java further divides an object reference into four levels from high to low: StrongReference, SoftReference, WeakReference and PhantomReference. If strong reference is applied to an object, garbage collector will never reclaim this object and its occupied memory. But if weak reference is applied to an object (named referent), this object may be garbage collected while keeping its reference relationship. When a garbage collector thread scans its managed memory space, once an object only having a weak reference is found, the garbage collector will reclaim the memory corresponding to the object irrespective of whether the current memory space is sufficient or not. Weak references can be used together with a ReferenceQueue to notify a program that memory space has been reclaimed. If an object having a weak reference has been reclaimed by garbage collector, Java Virtual Machine will put this weak reference to the associated reference queue.

Figure 4:
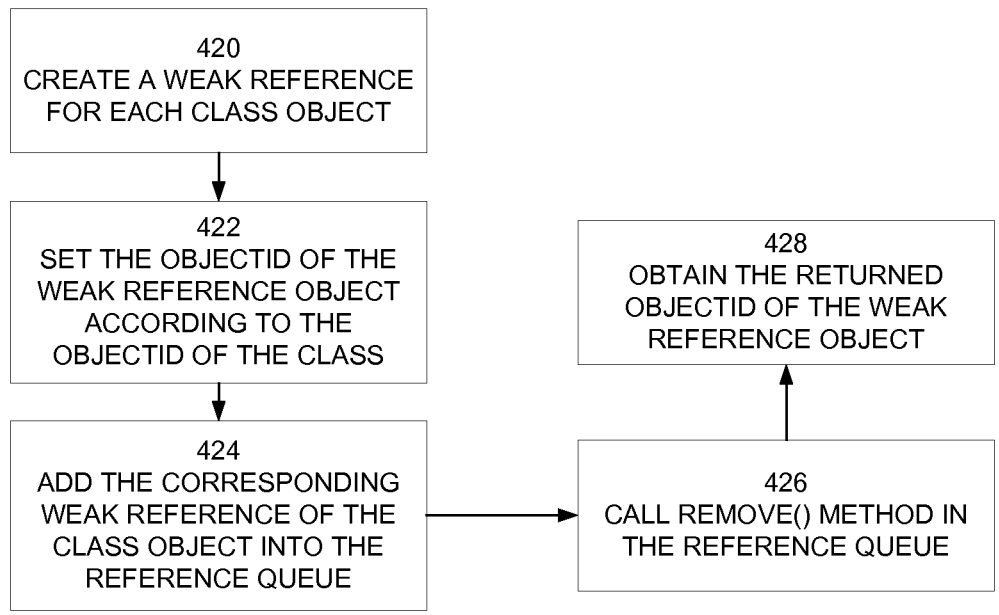
FIG. 4 is a flowchart of the steps for obtaining the information of the unloaded class according to one embodiment of the invention.

Based on the above features of garbage collection and object reference in Java programs, the weak reference information returned from Java Virtual Machine can be used to obtain the information of the reclaimed Class objects (corresponding to the unloaded classes). Specifically, FIG. 4 is a flowchart of the steps for obtaining the information of the unloaded classes according to one embodiment of the invention. As shown in FIG. 4, the information of the unloaded classes can be obtained through the following steps. At step 420, a weak reference is created for each Class object o. The weak reference is an object of weak reference class Java-.lang.ref.WeakReference defined by the Java system. As mentioned above, such a weak reference won't stop a garbage collector to reclaim Class object o. Moreover, at step 422, an ID is set for each weak reference object according to the above-mentioned objectID. Actually, the original weak reference class doesn't have a data member ID. Therefore, similar to the above modification to the class Class, for weak reference class Java.lang.ref.WeakReference, a data member representing an ObjectID can be added and in the member method the value of said ObjectID can be set equal to the ObjectID of its referenced class object. In this way, each weak reference object has the same ID with its referenced Class object o. Then, at step 424, the weak reference object corresponding to the Class object o is added to the reference queue. Then, at step 426, remove( )method is called in the reference queue, which sends a request to the runtime environment and waits for a remove notification from the runtime environment. Actually, calling remove( )method will make the Java Virtual Machine check whether there are weak referenced objects in the reference queue garbage collected; if no, it blocks and waits; if yes, Java Virtual Machine will return the information about the weak reference objects corresponding to the garbage collected objects. Therefore, at step 428, once a certain Class object o is reclaimed, remove( ) method will return the ID of the corresponding weak reference object. Because the ID of the weak reference object is set as equal to objectID of the referenced Class object o at step 422, the ID of the garbage collected Class object can be obtained at step 428. Thus, using weak references to Class objects and garbage collection mechanism, the ID of the unloaded class objects can be obtained from the interface provided by Java Virtual Machine.

Although the detailed process of obtaining the unloaded object information is described in connection with the features of Java programs, it is understood that for other Object-Oriented languages, on the basis that a unique ID has been assigned to each class object, the unloaded class object information can be obtained by using the interface and calling method provided by the runtime environment.

After getting the unloaded class object information, the memory space for storing the memory access information of the unloaded class objects can be released at step 204 in FIG. 2. Specifically, once getting the ID of an unloaded class object from the runtime environment, it can remove the memory access information related to this object and release its occupied memory space. Since the unnecessary memory access information has been removed and the huge memory space occupied by said information has been released, the extra memory overhead caused by tracing memory access can be greatly reduced.

In summary, the above embodiments of this invention assign a unique ID for each class object by modifying the class definition of Object-Oriented programs, obtain the ID of the unloaded classes via calling the interface provided by the runtime environment, and accordingly remove the memory access information of the unloaded classes, so as to realize tracing memory access more efficiently.

Based on the same inventive concept, the embodiments of this invention also provide an apparatus for tracing the memory access of Object-Oriented programs. FIG. 5 is a block diagram of the apparatus according to one embodiment of the invention. To illustrate more clearly the relation between the apparatus of this invention and the memory access tracing system of the existing technique, FIG. 5 shows the modification based on the system in FIG. 1, wherein the original code inserting module is revised to code modifying unit 502, and a class unloading tracing unit 510 is newly added. In the apparatus in FIG. 5, the code modifying unit 502 is configured to assign an ID for at least one class in the Object-Oriented program by modifying the class definition of the program; the class unloading tracing unit 510 is configured to request the class unloading related information from the runtime environment, obtain the ID of the unloaded class object according to the returned information, and release the memory space for storing the memory access information of the unload class object.

Specifically, the code modifying unit 502 can add codes for tracing memory access events in Object-Oriented programs. When adding such codes, the code modifying unit 502 can add a new data member in the class definition that describes each common class. By defining a member method to make said data member specific for each class, unit 502 assigns a unique ID for each class object in the program.

Taking Java language for example, the code modifying unit 502 can insert the codes for tracing memory access into proper position of the original Java program, and modify the class definition Java.lang.Class that describes the class operation information in the Java library. Specifically, the code modifying unit 502 adds a new data member objectID in Java.lang.Class, and sets the value of objectID in a member method via a construction function, such that each object of the class Class has a unique objectID value. In different examples, there may have different construction functions, for example, functions setting an objectID equal to a counter value in the program, equal to the loading time of the class, equal to UUID generated by the system, etc. Via the above modification, each Class object has a different objectID value, and accordingly each class is assigned a unique ID.

On the basis that each loaded class has its unique ID, the class unloading tracing unit 510 obtains the ID of the unloaded class object according to the returned class unloading information from the runtime environment, and correspondingly releases the memory space for storing the memory access information.

Still taking Java for example, in connection with the feature of garbage collection and object reference in Java programs, the class unloading tracing unit 510 can obtain the information of the reclaimed Class object using the weak reference information returned from the runtime environment. Specifically, the class unloading tracing unit 510 is configured to execute the following steps: firstly, create a weak reference for each Class object o and set the ID of the weak reference object equal to the ID of Class object o; then, add the weak reference object corresponding to Class object o into the reference queue and call remove( ) method in the reference queue, which sends a request to the runtime environment and waits for the notification from the runtime environment. Once a certain Class object o is garbage collected, remove( )method will return the ID of the corresponding weak reference. Since the ID of the weak reference has been set equal to the ID of the referenced Class object o, the class unloading tracing unit 510 can obtain the ID of the garbage collected Class object, i.e. the ID of the unloaded class object.

Based on that the unloaded class information has been obtained, the class unloading tracing unit 5210 can remove the memory access information related to this class and release its occupied memory space, which reduces the extra memory overhead caused by tracing memory access events.

Although the above embodiments are described in connection with Java language, it is understood that because Object-Oriented languages have common features about class, object, and so on, for other Object-Oriented languages, after reading this description, those skilled in the art can configure the code modifying unit to assign an ID for each class in the program, and configure the class unloading tracing unit according to the interface property of the runtime environment of each language to obtain the unloaded class information using the interface provided by the runtime environment, and thereby release the memory space related to the unloaded class.

From the above description in connection with the embodiments, it can be seen that the apparatus and method for tracing memory access of this invention can trace the memory access events of Object-Oriented programs while reducing the extra memory overhead and improving the memory space efficiency.

Those skilled in the art can understand that the above-mentioned method and apparatus for tracing memory access can be practiced by executable instructions and/or controlling codes in the processors e.g. codes provided in mediums like disc, CD or DVD-ROM; and memories like ROM or EPROM. The apparatus and its units can be realized using hardware like VLSI or Gates and Arrays, like semiconductors e.g. Logic Chip, transistors, etc., or like programmable hardware equipments e.g. FPGA, programmable logic equipments, etc.; or using software executed by different kinds of processors; or using the integration of said hardware and software. The application for implementing the invention can be programmed using object-oriented languages like Java, Smalltalk, C++, etc., and the traditional procedural languages like C language or other similar languages. The source code can be executed locally or remotely.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

The invention claimed is:

1. A method executed by a computer for tracing the memory accesses of an object-oriented program, comprising:
   assigning a unique identification to each class object created from at least one class in the object-oriented program by modifying a class definition of the at least one class;
   in response to an unloading of one of the class objects, obtaining class unloading related information from a runtime environment of the object-oriented program and obtaining the unique identification of the unloaded class object according to the returned information; and releasing memory space assigned to the unloaded class object for storing the memory access information of the unloaded class object.

2. The method of claim 1, wherein the assigning a unique identification to each class object further comprises
adding an objectID data member to the definition of the at least one class, and
using an object method to assign a unique value of objectID to each object created from the at least one class.

3. The method of claim 2, wherein said assigning a unique value of objectID further comprises one of the following methods:
setting the value of objectID as equal to a counter value in the program, wherein said counter value increases along with the class loading;
setting the value of objectID as equal to the loading time of the class;
setting the value of objectID as equal to UUID generated by the system.

4. The method of claim 1, wherein said obtaining the unique identification of an unloaded class object comprises:
creating a weak reference object corresponding to the unloaded class object before it is unloaded;
setting an objectID of the weak reference object equal to the unique identification of said unloaded class object before it is unloaded;
adding the weak reference object to a reference queue;
calling a remove( )method in the reference queue to request the runtime environment to return the class unloading related information of the class object when the corresponding object class is unloaded and
obtaining the unique identification of the weak reference object returned from the runtime environment, to identify the unloaded class object.

5. The method of claim 1, wherein said releasing the memory space for storing the memory access information of the unloaded class object further comprises removing the memory access information related to said unloaded class object.

6. An apparatus for tracing memory accesses of an object-oriented program, comprising:
a computer with at least one processor and memory;
a code modifying unit executing in the memory of the computer, the modifying unit being configured to assign a unique identification to each class object created from at least one class in the object-oriented program by modifying a class definition of the at least one class; and
a class unloading tracing unit executing in the memory of the computer, the tracing unit being configured to request class object unloading related information from the runtime environment when one of the class objects is unloaded, obtain the unique identification of the unloaded class object according to the returned information, and release memory space assigned for storing memory access information of the unloaded class object.

7. The apparatus of claim 6, wherein said code modifying unit is configured to add a data member objectID to said class definition, and to set the objectID in each class object created from the class definition to a unique identification.

8. The apparatus of claim 7, wherein said code modifying unit is configured to execute one of the following functions:
setting objectID in each class object created from the class definition as equal to a counter value, wherein the counter value is incremented with each creation of a class object;
setting objectID in each class object created from the class definition as equal to the loading time of the class;
setting the value of objectID in each class object created from the class definition as equal to UUID generated by the system.

9. The apparatus of claim 6, wherein said class unloading tracing unit is configured to:
create a weak reference object corresponding to an unloaded class object before it is unloaded;
set an objectID of the weak reference object equal to the unique identification of said unloaded class object before it is unloaded;
call a remove( ) method in the reference queue to request the runtime environment to return the class unloading related information of the class object when the corresponding object class is unloaded and
obtain the unique identification of the weak reference object returned from the runtime environment to identify the unloaded class object.

10. The apparatus of claim 6, wherein said class unloading tracing unit is configured to release the memory space for storing the memory access information of the unloaded class object.

11. A non-transitory computer-readable storage medium having program code executed by a computer for tracing the memory accesses of an object-oriented program, comprising:
program code for assigning a unique identification to each class object created from at least one class in the object-oriented program by modifying a class definition of the at least one class;
program code responsive to an unloading of one of the class objects, for obtaining class unloading related information from a runtime environment of the object-oriented program and obtaining the unique identification of the unloaded class object according to the returned information; and
program code for releasing memory space assigned to the unloaded class object for storing the memory access information of the unloaded class object.

12. The computer-readable storage medium of claim 11, wherein the program code for assigning a unique identification to each class object further comprises
program code for adding an objectID data member to the definition of the at least one class, and
program code for using an object method to assign a unique value of objectID to each object created from the at least one class.

13. The computer-readable storage medium of claim 12, wherein the program code for assigning a unique value of objectID further comprises one of the followings:
program code for setting the value of objectID as equal to a counter value in the program, wherein said counter value increases along with the class loading;
program code for setting the value of objectID as equal to the loading time of the class;
program code for setting the value of objectID as equal to UUID generated by the system.

14. The computer-readable storage medium of claim 11, wherein said the program code for obtaining the unique identification of an unloaded class object further comprises:

program code for creating a weak reference object corresponding to the unloaded class object before it is unloaded;

program code for setting an objectID of the weak reference object equal to the unique identification of said unloaded class object before it is unloaded;

program code for adding the weak reference object to a reference queue;

program code for calling a remove( )method in the reference queue to request the runtime environment to return the class unloading related information of the class object when the corresponding object class is unloaded and program code for obtaining the unique identification of the weak reference object returned from the runtime environment, to identify the unloaded class object.

15. The computer-readable storage medium of claim 11, wherein the program code for releasing the memory space for storing the memory access information of the unloaded class object further comprises program code for removing the memory access information related to said unloaded class object.

* * * * *